(12) United States Patent
Menon et al.

(10) Patent No.: US 12,265,966 B2
(45) Date of Patent: Apr. 1, 2025

(54) SYSTEMS AND METHODS FOR FAILED PAYMENT RECOVERY SYSTEMS

(71) Applicant: Butter Payments, Inc., San Francisco, CA (US)

(72) Inventors: Vijay Menon, Berkeley, CA (US); Kevin Perko, San Francisco, CA (US)

(73) Assignee: Butter Payments, Inc., San Francisco, CA (US)

( * ) Notice: Subject to any disclaimer, the term of this patent is extended or adjusted under 35 U.S.C. 154(b) by 16 days.

(21) Appl. No.: 17/813,884

(22) Filed: Jul. 20, 2022

(65) Prior Publication Data

US 2023/0029024 A1 Jan. 26, 2023

Related U.S. Application Data

(60) Provisional application No. 63/224,341, filed on Jul. 21, 2021.

(51) Int. Cl.
*G06Q 20/40* (2012.01)
(52) U.S. Cl.
CPC ................. *G06Q 20/4016* (2013.01)
(58) Field of Classification Search
CPC .................................................. G06Q 20/4016
See application file for complete search history.

(56) References Cited

U.S. PATENT DOCUMENTS

| | | | | |
|---|---|---|---|---|
| 11,636,397 B1 * | 4/2023 | Sainani | ................. | G06F 16/248 707/769 |
| 2007/0087756 A1 * | 4/2007 | Hoffberg | .......... | G06Q 10/06375 455/450 |
| 2010/0235285 A1 * | 9/2010 | Hoffberg | .............. | G06Q 50/188 705/37 |
| 2010/0317420 A1 * | 12/2010 | Hoffberg | ............ | G06Q 30/0282 463/1 |
| 2014/0067514 A1 * | 3/2014 | Vitti | .................... | G06Q 30/0236 705/14.1 |
| 2017/0265076 A1 * | 9/2017 | Richards | ............ | G06Q 30/0248 |
| 2020/0151726 A1 * | 5/2020 | Song | ...................... | G06N 20/00 |
| 2020/0327458 A1 * | 10/2020 | Dutt | ..................... | G06Q 20/321 |
| 2021/0125179 A1 * | 4/2021 | Mach | ................... | G06Q 20/401 |

FOREIGN PATENT DOCUMENTS

WO WO-2020068141 A1 * 4/2020 ............. G06N 20/00

OTHER PUBLICATIONS

The EMV Standard: Break, Fix, Verify; Published in: 2021 IEEE Symposium on Security and Privacy (SP) (pp. 1766-1781) Authors: David Basin • Ralf Sasse • Jorge Toro-Pozo (Year: 2021).*

(Continued)

*Primary Examiner* — Bruce I Ebersman
(74) *Attorney, Agent, or Firm* — Fish & Richardson P.C.

(57) ABSTRACT

Systems and methods for failed payment recovery can include a method for payment recovery. The method includes steps for receiving a set of transaction information, predicting a set of one or more authorization field values based on the received set of transaction information, predicting a set of one or more optimal send times based on the received set of transaction information, and transmitting a set of one or more authorization messages based on the predicted set of authorization field values and the predicted set of optimal send times.

17 Claims, 4 Drawing Sheets

(56) References Cited

OTHER PUBLICATIONS

Enhancing communication adaptability between payment card processing networks; Published in: IEEE Communications Magazine (vol. 53, Issue: 3, pp. 58-64) Authors: Adnan Noor Mian • Abdul Hameed • Muhammad Umar Khayyam • Farooq Ahmed • Roberto Beraldi (Year: 2015).*

Instant payment versus smartphone payment: The big fight?, IEEE (Year: 2017).*

Emerging ecommerce credit and debit card protocols, IEEE (Year: 2002).*

"How to optimize your payment strategy to prevent involuntary churn", printed from https://gocardless.com/en-us/guides/posts/recalibrate-your-payment-mix-to-reduce-involuntary-churn/, 12 pgs.

"Why Passive Churn is Harmful and How You Can Grow Your Customer Base During COVID-19 with Recurring Billing", Subscriptionflow.com, May 11, 2020, https://www.subscriptionflow.com/2020/05/why-passive-churn-is-harmful-and-how-you-can-grow-your-customer-base-during-covid-19-with-recurring-bil . . . , 5 pgs.

Cancilla, "Using automation to fight passive churn", Blog, Nov. 13, 2018, 6 pgs.

Editorial Team, "How Recurly Uses Machine Learning to Reduce Transaction Declines", Blog, https://recurly.com/blog/how-recurly-uses-machine-learning-to-reduce-transaction-declines/, 5 pgs.

Editorial Team, "Manually retrying payments? There's a better way", Blog, Mar. 30, 2021, https://recurly.com/blog/manually-retrying-paymens-theres-a-better-way, 6 pgs.

Fiserve, "Say hello to revenue", 4 pgs.

Mathison, "Reduce Passive Customer Churn with Authorization Optimization", Mar. 25, 2019, 5 pgs.

Pk et al., "Credit Card Declines Messages: Everything you Need to Know", Blog, Mar. 9, 2021, https://www.chargebee.com/blog/making-sense-credit-card-declines/, 15 pgs.

VB Staff, "Passive subscriber churn—and how to mitigate it (VB Live)", printed from https://venturebeat.com/2018/04/12/passive-subscriber-churn-and-how-to-mitigate-it-vb-Live/, 7 pgs.

Vindicia, "Hidden Keys to Higher Customer Retention", 14 pgs.

Vindicia, "Vindicia Retain: Increase retention and grow recurring revenue", Datasheet 4 pgs.

Vindicia, "Vindicia Retain: Keep more subscribers and revenue every billing cycle", 8 pgs.

Vindicia, "Vindicia Subscription Intelligence—Steer your business with insights gained from subscription data", datasheet, 2 pgs.

* cited by examiner

SYSTEMS AND METHODS FOR FAILED PAYMENT RECOVERY SYSTEMS

CROSS-REFERENCE TO RELATED APPLICATIONS

The current application claims the benefit of and priority under 35 U.S.C. § 119 (e) to U.S. Provisional Patent Application No. 63/224,341 entitled "Systems and Methods for Failed Payment Recovery Systems" filed Jul. 21, 2021, the disclosure of which is hereby incorporated by reference in its entirety for all purposes.

FIELD OF THE INVENTION

The present invention generally relates to failed payment recovery and, more specifically, novel systems and processes for intelligent failed payment recovery.

BACKGROUND

Valid payment requests for software as a service (SaaS) subscriptions or discrete purchase invoices due often fail due to the rapidly changing landscape around authorizations driven largely by the banking ecosystem's desire to minimize fraud. These failed payments result in lost customers and revenue, widely referred to as "passive churn". For these types of failed payments today, existing solutions simply retry the payments using basic parameters such as how often to retry and for how long.

SUMMARY OF THE INVENTION

Systems and methods for failed payment recovery in accordance with embodiments of the invention are illustrated. One embodiment includes a method for payment recovery. The method includes steps for receiving a set of transaction information, predicting a set of one or more authorization field values based on the received set of transaction information, and predicting a set of one or more optimal send times based on the received set of transaction information. The method further includes steps for transmitting a set of one or more authorization messages based on the predicted set of authorization field values and the predicted set of optimal send times.

In a further embodiment, the transaction information includes at least one selected from the group consisting of transaction amount, card information, merchant information, and product information.

In still another embodiment, predicting the set of one or more authorization field values includes filtering to exclude at least one authorization field value from the set of authorization field values.

In a still further embodiment, predicting the set of one or more authorization field values includes modifying at least one authorization field value of the set of authorization field values.

In yet another embodiment, predicting the set of optimal send times includes using an epsilon greedy explore exploit approach.

In a yet further embodiment, the set of authorization messages are formatted in accordance with ISO-8583.

In another additional embodiment, predicting the set of authorization field values includes using a machine learning model to predict a subset of the set of authorization field values to be included in an authorization message to produce the highest likelihood of success.

In a further additional embodiment, predicting the set of optimal send times includes using a machine learning model to predict a set of one or more optimal send times at which to send an authorization message to produce the highest likelihood of success.

In another embodiment again, the method further includes steps for determining that an authorization message has failed, predicting a second set of one or more authorization field values, and transmitting a second set of one or more authorization messages based on the predicted second set of authorization field values.

In a further embodiment again, the method further includes steps for determining that an authorization message has failed, predicting a second set of one or more optimal send times, and transmitting a second set of one or more authorization messages based on the predicted second set of optimal send times.

In still yet another embodiment, predicting the set of optimal send times is a velocity aware approach based on an expected or predicted number of transactions at a given recipient for an authorization message.

One embodiment includes a non-transitory machine readable medium containing processor instructions for payment recovery, where execution of the instructions by a processor causes the processor to perform a process that comprises receiving a set of transaction information, predicting a set of one or more authorization field values based on the received set of transaction information, and predicting a set of one or more optimal send times based on the received set of transaction information. The process further includes transmitting a set of one or more authorization messages based on the predicted set of authorization field values and the predicted set of optimal send times.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Figure 1:
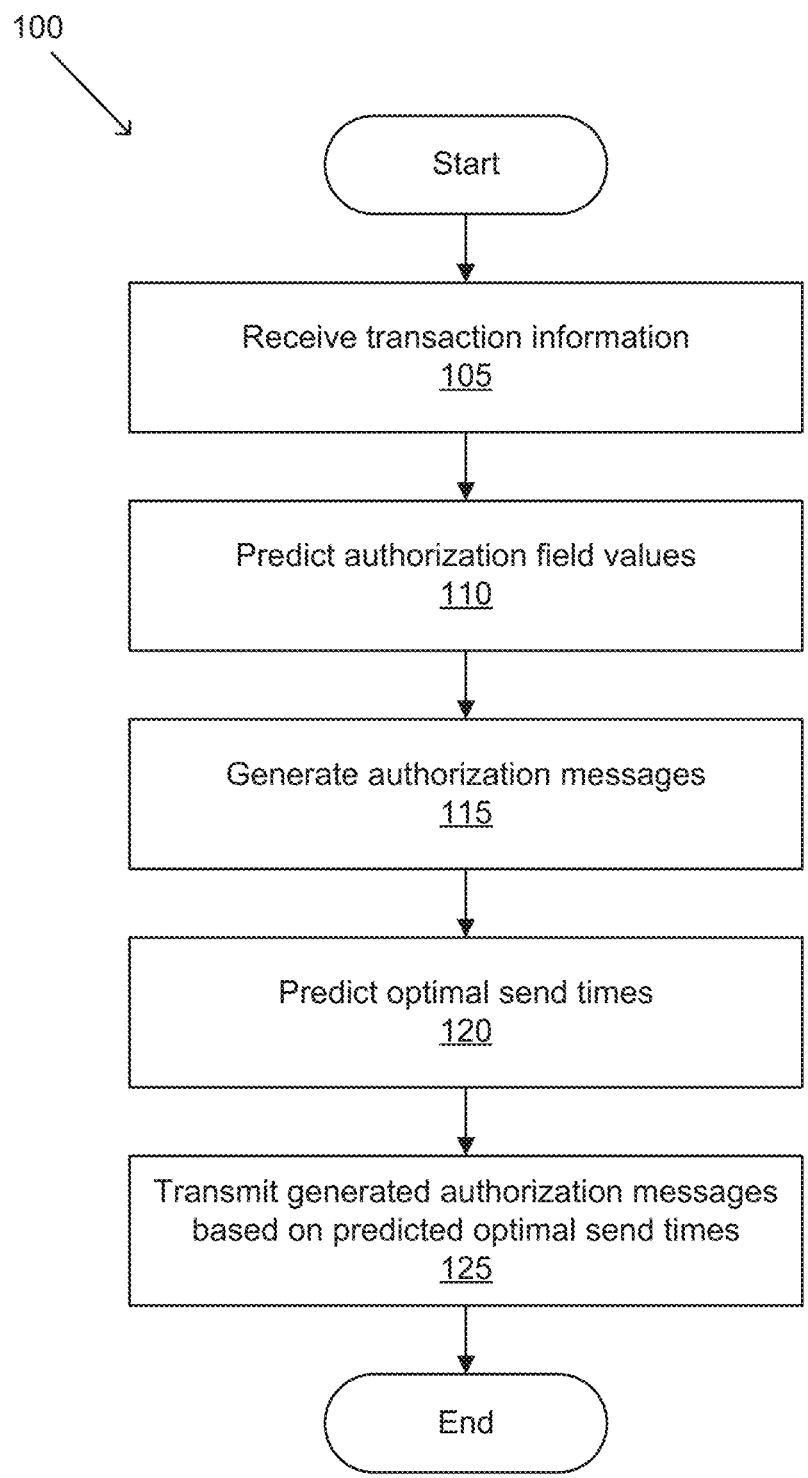
FIG. 1 illustrates a process for payment recovery in accordance with an embodiment of the invention.

An increasing portion of e-commerce & non-POS payments today do not happen in real time. As a result of the rise of the subscription economy, online & card not present payments can now be categorized into roughly two categories: real time (either one off purchases, or initial subscription product checkouts—generally through a checkout entry form) and recurring (queued payments on a pre-defined contractual basis—typically weekly, monthly, or annual).

Subscription invoices often fail passively (on account of payment or invoice delivery failure) as opposed to actively (on account of a customer calling support, or canceling via a self-serve online portal). For SaaS subscription companies, typically 20-70% of churn is passive, which can be costly because each attempt may induce a cost from a merchant to a PSP. These companies often assume that the problem is incurable, i.e., that if a payment service provider (PSP) returns a failed payment error, that there is no way to remediate. In reality, PSPs often return payment failure responses, not because the card details are illegitimate, but because the merchant (the provider of the software service) has set up their payments backend incorrectly which can induce a higher likelihood that a legitimate attempt by an end user to pay for a service will fail.

One of the problems with card authorization for recurring payments is that modern engineering queues are designed to run over certain pre-defined hourly and daily windows (typically defined by cronjobs). Because of how engineering queues are designed, transaction attempts are not spread evenly across these windows of time. PSPs and card issuers often do not distinguish between the two types of payments—and as a result, they view these bursts of payments as fraudulent card testing events at an abnormally high rate of false flagging (even though these are perfectly legitimate payments).

Systems and methods in accordance with various embodiments of the invention can utilize novel processes to recover failed payments and to ensure valid payments are approved at the highest rate possible. In various embodiments, processes can utilize payload optimization and/or timing optimization to foster increased global payment authorization rates on the basis of novel machine learning algorithms and payload optimizations. While payment optimization in accordance with many embodiments of the invention can be performed for each transaction, in certain embodiments, optimizing authorization messages and/or send times may only be performed after a failed payment attempt. In various embodiments, processes can modify each attempt (e.g., by filtering/adding fields, modifying field values and/or send times, etc.) contingent on each failure outcome.

In numerous embodiments, processes can utilize payment authorization payload optimization derived from advanced machine learning and artificial intelligence. Machine learning models used in accordance with various embodiments of the invention can include (but are not limited to) supervised learning methods (e.g., decision trees, regressions, artificial neural networks, etc.) and/or reinforcement learning methods (e.g., epsilon greedy processes, Multi-Armed Bandits, other explore/exploit algorithms, etc.). Payload optimization in accordance with various embodiments of the invention can include (but is not limited to) data element filtration, Bank Identification Number (BIN) database optimizations, etc. Systems in accordance with certain embodiments of the invention can include an intelligent back-end to offer predictive insights on optimal exposure by issuer, a filtering mechanism to drop fields that induce higher rates of payment denial, and/or an augmentation process to expose fields that increase the likelihood of payment acceptance.

Timing optimization in accordance with many embodiments of the invention can use a unique combination of custom retry times and durations. In various embodiments, processes can introduce multiple Dunning schedules that are optimized on a per customer basis while also modifying each individual transaction message to ensure the highest likelihood of success. Processes in accordance with certain embodiments of the invention can use machine learning to optimize the collection attempt timing (e.g., day of week and time of day) and/or optimize the payload (amount, fields, and flags) that are passed to a PSP for a payment outcome response. In certain embodiments, timing optimization processes can be velocity aware or based on an expected or predicted number of transactions at a given PSP.

By predicting optimal send times and/or optimized authorization fields, processes in accordance with several embodiments of the invention can increase the likelihood of successful processing and minimize retries to reduce unnecessary congestion at the merchant and/or PSP. Processes in accordance with numerous embodiments of the invention can minimize payment collection attempts and maximize authorization rates (the percentage likelihood that a payment collection attempt results in a successful payment collection). Systems in accordance with numerous embodiments of the invention can result in savings of 3-6% of top line revenue and can allow end users submitting legitimate payment information to enjoy greater access to software services they intend to use.

A. Payment Recovery

A process for payment recovery in accordance with an embodiment of the invention is illustrated in FIG. 1. Process 100 receives (105) transaction information. Transaction information in accordance with a variety of embodiments of the invention can include various data related to a transaction, such as (but not limited to) a transaction amount, card information (e.g., BIN, scheme, issuing country, issuing bank, funding source, etc.), merchant information, product information, etc.

Process 100 predicts (110) a set of one or more authorization field values to be used in an authorization message. In a variety of embodiments, processes can predict a set of authorization field values by modifying existing authorization field values. Processes in accordance with some embodiments of the invention can predict authorization field values by filtering out authorization fields from being included in an authorization message. In many embodiments, processes can predict (or optimize) field values using machine learning and a BIN database (encoding card scheme and issuing bank information, among others) to accommodate optimal authorization requirements for each issuer/scheme pair.

Process 100 generates (115) a set of one or more authorization messages based on the predicted set of authorization field values. Authorization messages in accordance with a number of embodiments of the invention can be formatted in various ways (e.g., in accordance with ISO-8583). In various embodiments, authorization messages can include various numbers of data elements (e.g., 192) in each message that can be optimized per transaction.

Process 100 predicts (120) a set of one or more optimal send times. Processes in accordance with certain embodiments of the invention can implement machine learning processes that predict optimal times to run a payment to induce the highest likelihood of payment success. In several embodiments, processes can generate predictions for optimal times based on a set of one or more parameters, including (but not limited to): funding source (credit, debit, prepaid, etc.), card scheme (Visa, Mastercard, American Express, etc.), issuing country (USA, India, Japan, Indonesia, etc.), previous card error (insufficient funds, card not supported, etc.).

Process 100 transmits (125) the generated set of authorization messages based on the predicted set of optimal times. In certain embodiments, processes can compute a likelihood for acceptance for transactions using various different fields, field values, send times, etc. in order to determine the authorization message with the highest likelihood for acceptance and transmits the generated authorization message based on the determination. Transmitting authorization messages in accordance with many embodiments of the invention can include scheduling authorization messages to be sent at a future time.

While specific processes for payment recovery are described above, any of a variety of processes can be utilized to recover payments as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

1. Field Optimization

E-commerce and subscription based online payments suffer from a lower rate of payment acceptance than physical and point of sale purchases because of the higher risk of associated fraud. ISO 8583 defines an international standard & protocol for card originated transactions. ISO 8583 messages consist of message type indicators, bitmaps, and data elements. Most companies standardize their authorization messages, but there are up to 192 different fields that can be populated with an authorization attempt. Each individual issuer has different rules for when to decline charges, and there is no universal standard, so companies integrating with our system can experience significant holistic gains in approval rates.

Processes in accordance with many embodiments of the invention can modify (e.g., filter, augment, etc.) any of these 192 elements for an authorization message. In many embodiments, processes can modify a subset of these elements. Systems and methods in accordance with a variety of embodiments of the invention can pre-format, mutate, and/or optimize the fields exposed with an authorization message that is sent with a particular transaction on the basis of certain factors associated with that transaction. Such factors (or transaction information) can include (but are not limited to) card BIN, card scheme, issuing country, issuing bank, funding source, etc.

A credit card BIN is the first six digits of a credit card. This typically encodes two important pieces of information: the card scheme (VISA, MC, Discover, Diners, JCB, etc.) and the underlying issuing bank (Chase, Wells Fargo, State Bank of India, Banamex, etc.). Systems and methods in accordance with various embodiments of the invention can utilize a BIN database and machine learning to optimize payloads to accommodate the optimal authorization requirements for each issuer/scheme pair.

Processes in accordance with a variety of embodiments of the invention can use transaction information to determine whether or not to pass individual fields and/or flags, what amount to hold or process, values for different fields and/or flags, etc. for the highest likelihood of issuer acceptance. In certain embodiments, processes can compute a likelihood for acceptance for transactions using various different fields, field values, send times, etc. in order to determine the authorization message with the highest likelihood for acceptance.

In various embodiments, predicting authorization field values can include modifying various field values, such as (but not limited to) hold amounts, transaction amounts, transaction types, etc. For instance, processes in accordance with several embodiments of the invention can determine whether to include a ContAuth (suggesting that this is a recurring charge) or an ECOM (suggesting that this is one-off transaction) flag based on the predicted success rates.

When attempting to capture a payment, processes in accordance with many embodiments of the invention can decide what information to pass with a transaction. This can include (but is not limited to) things like address, AVS (address verification service), national ID, zip code, CVC code, and so on. In various embodiments, some fields may be filtered out for an authorization message, even when data to populate those fields is available.

While the inclusion of more fields is often better, it can often vary based on the context (e.g., issuing bank, country, transaction amount, etc.). Individual issuer risk rules will often flag payments as fraud because of the inclusion of a field (for instance, a CVC) that they would otherwise accept in its absence. Processes in accordance with a variety of embodiments of the invention can utilize so-called "Drop" parameters including DropAVS, DropCVC, Drop3DS, and so on to introduce fields that can be dropped (or filtered) from an authorization message.

Similarly, processes in accordance with several embodiments of the invention can augment data elements to correspond to both issuer and scheme requirements. For example, this may include marking certain fields as required for each authorization message. Although many of the examples described herein modify and/or filter elements for amounts, fields, and/or flags, one skilled in the art will recognize that similar systems and methods can be used to modify any type of data, without departing from this invention.

2. Scheduling Optimization

Billing distributions can jump upwards of 100× minute by minute, with artificially poor results ensuing that can lead directly to customer drop-off via authorization declines. Queue systems on the engineering side are designed for burst at the top of a cycle (typically corresponding to an hour). The level of uneven distribution is contingent on exactly how the workers consume, but systems set up in this typical way are never evenly distributed across a given time period due to standard engineering best practice for job queues and systems.

This can result in PSPs and issuers responding with an artificially high rate of declines on legitimate payment instruments due to the belief that fraud is occurring (as these systems don't distinguish between real time checkout and queued checkouts at an e-commerce level). As a result, attempted invoicing fails in a similar fashion to the mechanism responsible for DDOS (denial of service) attacks.

Systems and methods in accordance with certain embodiments of the invention can minimize accidental churn by balancing the distribution across these queues to normalize card authentication rates. Processes in accordance with various embodiments of the invention can dynamically adjust the schedule for recurring payments via an epsilon greedy explore exploit approach. Processes in accordance with several embodiments of the invention can utilize reinforcement learning algorithms (such as, but not limited to, Multi Armed Bandits), which can be highly effective at optimizing the spread of minutely payment transactions in such a way as to minimize fraud risk while maximizing payment acceptances.

B. Systems for Payment Recovery

1. Payment Recovery System

Figure 2:
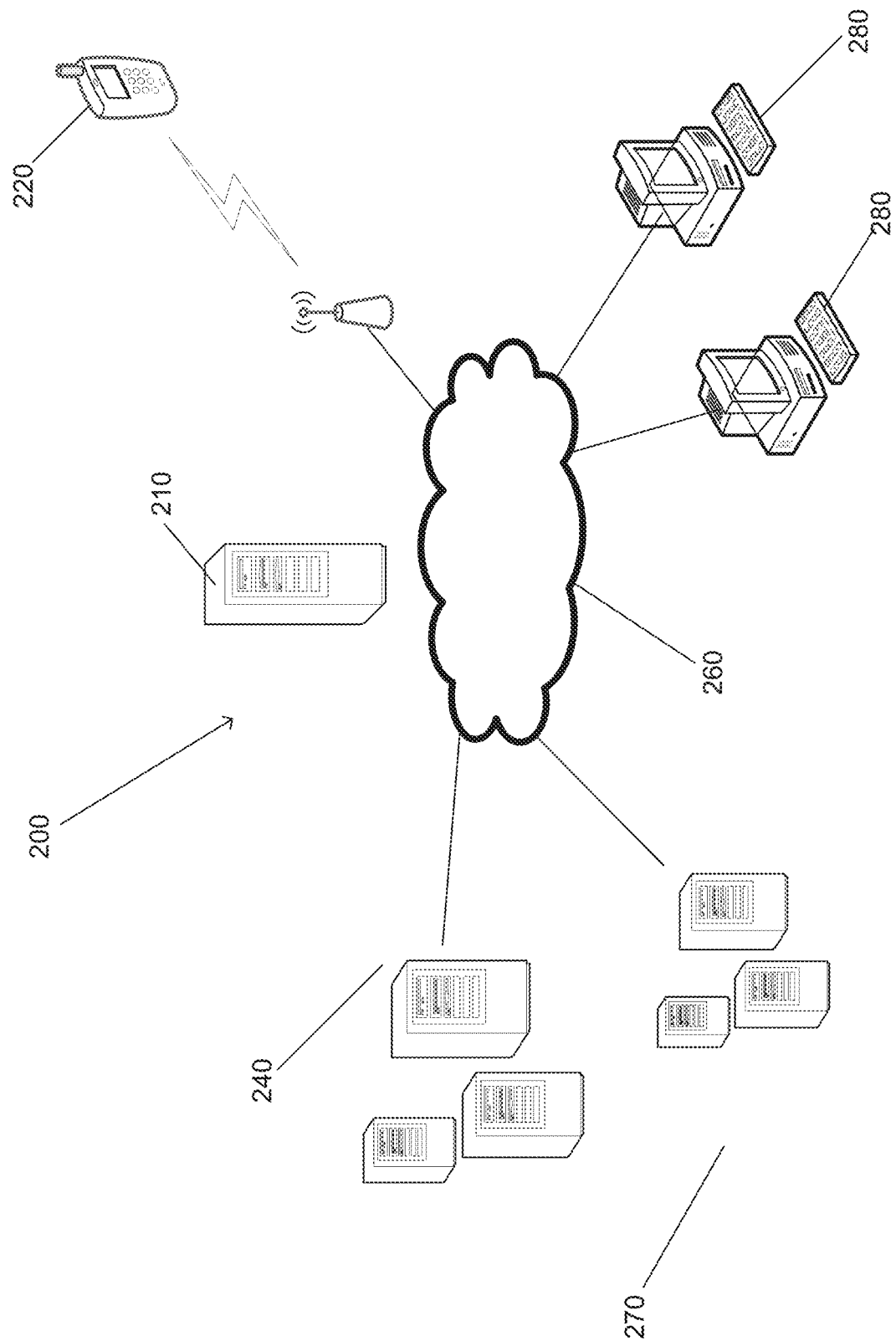
FIG. 2 illustrates an example of a payment recovery system that recovers payments in accordance with an embodiment of the invention.

An example of a payment recovery system that recovers payments in accordance with an embodiment of the invention is illustrated in FIG. 2. Network 200 includes a communications network 260. The communications network 260 is a network such as the Internet that allows devices connected to the network 260 to communicate with other connected devices. Server systems 210, 240, and 270 are connected to the network 260. Each of the server systems 210, 240, and 270 is a group of one or more servers communicatively connected to one another via internal networks that execute processes that provide cloud services to users over the network 260. One skilled in the art will recognize that a payment recovery system may exclude certain components and/or include other components that are omitted for brevity without departing from this invention.

For purposes of this discussion, cloud services are one or more applications that are executed by one or more server systems to provide data and/or executable applications to devices over a network. The server systems 210, 240, and 270 are shown each having three servers in the internal network. However, the server systems 210, 240 and 270 may include any number of servers and any additional number of server systems may be connected to the network 260 to provide cloud services. Server systems in accordance with a variety of embodiments of the invention can include systems for merchants, payment service providers, etc. In accordance with various embodiments of this invention, a payment recovery system that uses systems and methods that recover payments in accordance with an embodiment of the invention may be provided by a process being executed on a single server system and/or a group of server systems communicating over network 260.

Users may use personal devices 280 and 220 that connect to the network 260 to perform processes that recover payments in accordance with various embodiments of the invention. In the shown embodiment, the personal devices 280 are shown as desktop computers that are connected via a conventional "wired" connection to the network 260. However, the personal device 280 may be a desktop computer, a laptop computer, a smart television, an entertainment gaming console, or any other device that connects to the network 260 via a "wired" connection. The mobile device 220 connects to network 260 using a wireless connection. A wireless connection is a connection that uses Radio Frequency (RF) signals, Infrared signals, or any other form of wireless signaling to connect to the network 260. In the example of this figure, the mobile device 220 is a mobile telephone. However, mobile device 220 may be a mobile phone, Personal Digital Assistant (PDA), a tablet, a smartphone, or any other type of device that connects to network 260 via wireless connection without departing from this invention.

As can readily be appreciated the specific computing system used to recover payments is largely dependent upon the requirements of a given application and should not be considered as limited to any specific computing system(s) implementation.

2. Payment Recovery Element

Figure 3:
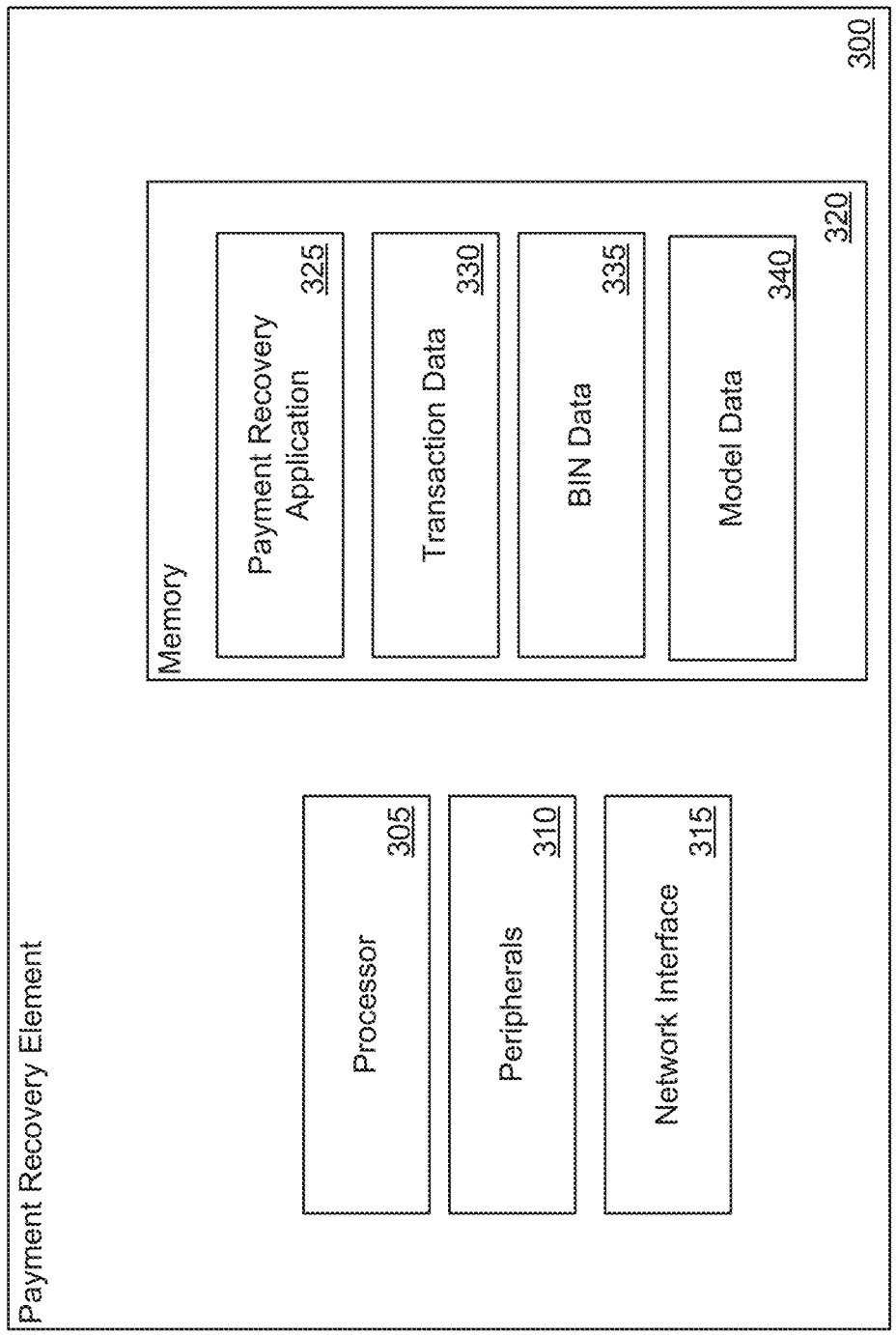
FIG. 3 illustrates an example of a payment recovery element that executes instructions to perform processes that recover payments in accordance with an embodiment of the invention.

An example of a payment recovery element that executes instructions to perform processes that recover payments in accordance with an embodiment of the invention is illustrated in FIG. 3. Payment recovery elements in accordance with many embodiments of the invention can include (but are not limited to) one or more of mobile devices, payment devices, and/or computers. Payment recovery element 300 includes processor 305, peripherals 310, network interface 315, and memory 320. One skilled in the art will recognize that a payment recovery element may exclude certain components and/or include other components that are omitted for brevity without departing from this invention.

The processor 305 can include (but is not limited to) a processor, microprocessor, controller, or a combination of processors, microprocessor, and/or controllers that performs instructions stored in the memory 320 to manipulate data stored in the memory. Processor instructions can configure the processor 305 to perform processes in accordance with certain embodiments of the invention. In various embodiments, processor instructions can be stored on a non-transitory machine readable medium.

Peripherals 310 can include any of a variety of components for capturing data, such as (but not limited to) cameras, scanners, displays, and/or sensors. In a variety of embodiments, peripherals can be used to gather inputs and/or provide outputs. Payment recovery element 300 can utilize network interface 315 to transmit and receive data over a network based upon the instructions performed by processor 305. Peripherals and/or network interfaces in accordance with many embodiments of the invention can be used to gather inputs that can be used to recover payments.

Memory 320 includes a payment recovery application 325, transaction data 330, BIN data 335, and model data 340. Payment recovery applications in accordance with several embodiments of the invention can be used to recover payments.

Transaction data in accordance with a variety of embodiments of the invention can include various data related to a transaction, such as (but not limited to) merchant data, customer data, card data, bank data, transaction amounts, etc. In certain embodiments, transaction data can include authorization data (e.g., success/failure data) from previous authorization attempts. In certain embodiments, BIN data can include a database of encoding card schemes and issuing bank information that can be used to train models and/or predict authorization field values and/or optimal send times.

In several embodiments, model data can store various parameters and/or weights for various models that can be used for various processes as described in this specification. Model data in accordance with many embodiments of the invention can be updated through training on transaction data captured on a payment recovery element or can be trained remotely and updated at a payment recovery element.

Although a specific example of a payment recovery element 300 is illustrated in this figure, any of a variety of payment recovery elements can be utilized to perform processes for payment recovery similar to those described herein as appropriate to the requirements of specific applications in accordance with embodiments of the invention.

3. Payment Recovery Application

Figure 4:
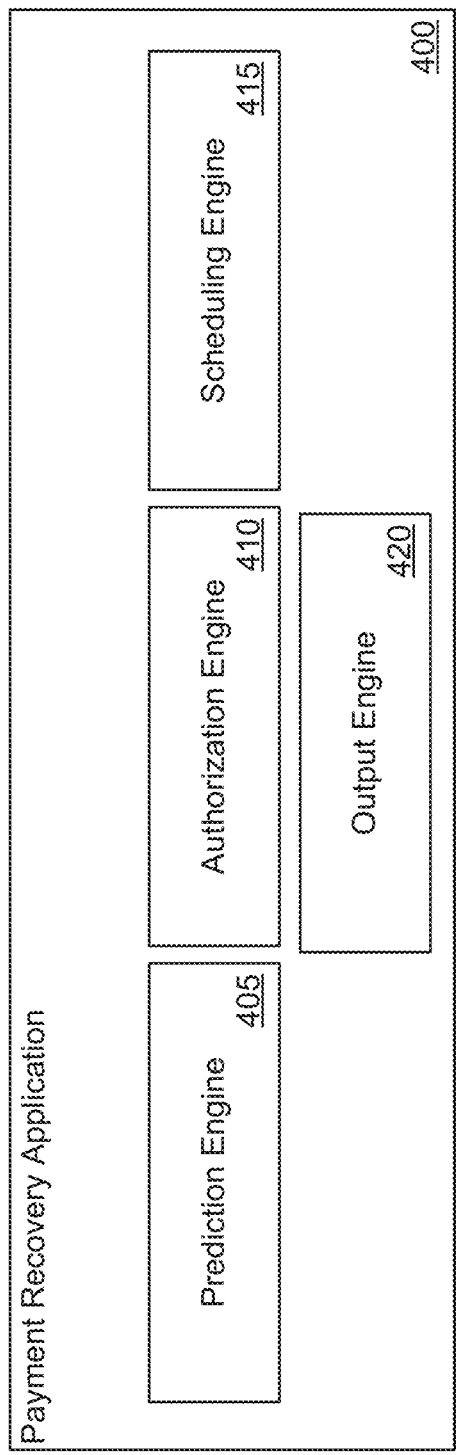
FIG. 4 illustrates an example of a payment recovery application for payment recovery in accordance with an embodiment of the invention.

An example of a payment recovery application for payment recovery in accordance with an embodiment of the invention is illustrated in FIG. 4. Payment recovery application 400 includes prediction engine 405, authorization engine 410, scheduling engine 415, and output engine 420.

One skilled in the art will recognize that a payment recovery application may exclude certain components and/or include other components that are omitted for brevity without departing from this invention.

Prediction engines in accordance with some embodiments of the invention can predict authorization field values and/or optimal send times. Predicting authorization field values in accordance with a number of embodiments of the invention can include filtering out authorization fields from being included in an authorization message. In many embodiments, prediction engines can predict (or optimize) field values using machine learning and a BIN database (encoding card scheme and issuing bank information, among others) to accommodate optimal authorization requirements for each issuer/scheme pair. Prediction engines in accordance with certain embodiments of the invention can implement machine learning processes that predict optimal times to run a payment to induce the highest likelihood of payment success.

In numerous embodiments, authorization engines can generate authorization messages based on predicted field values. Authorization engines in accordance with numerous embodiments of the invention can generate fields to filter fields of an authorization message and/or modify values associated with certain fields.

Output engines in accordance with several embodiments of the invention can provide a variety of outputs to a user, including (but not limited to) authorization messages, alerts, notifications, reports, etc. Scheduling engines in accordance with certain embodiments of the invention can schedule the transmission of authorization messages in accordance with predicted optimal send times.

Although a specific example of a payment recovery application is illustrated in this figure, any of a variety of payment recovery applications can be utilized to perform processes for payment recovery similar to those described herein as appropriate to the requirements of specific applications in accordance with embodiments of the invention.

Although specific methods of payment recovery are discussed above, many different methods of payment recovery can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for payment recovery, the method comprising:
   receiving, at a computing device, a set of transaction information;
   predicting, using a set of processors in the computing device, a set of one or more authorization field values based on the received set of transaction information, wherein the set of one or more authorization field values is predicted by using a set of one or more machine learning models to determine a subset of the set of one or more authorization field values to be included in an authorization message to produce a highest likelihood of successful authorization,
   wherein predicting the set of one or more authorization field values to be included in an authorization message to produce a highest likelihood of successful authorization comprises filtering out one or more authorization field values that decrease the likelihood of successful authorization,
   wherein predicting the set of one or more authorization field values comprises modifying at least one authorization field value of the set of one or more authorization field values;
   predicting, using the set of processors in the computing device, a set of one or more optimal send times based on the received set of transaction information, wherein the set of one or more optimal send times is predicted by using the set of one or more machine learning models to determine a set of one or more optimal send times at which to send an authorization message to produce a highest likelihood of successful authorization,
   wherein the set of one or more optimal send times is predicted based on an expected number of transactions at a given credit card issuer for an authorization message,
   wherein predicting the set of one or more optimal send times comprises using a reinforcement learning approach; and
   transmitting, from the computing device to the given credit card issuer, a set of one or more authorization messages based on the predicted set of one or more authorization field values and the predicted set of one or more optimal send times.

2. The method of claim 1, wherein the transaction information comprises transaction amount, card information, merchant information, and product information.

3. The method of claim 1, wherein predicting the set of one or more authorization field values comprises filtering to exclude at least one authorization field value from the set of one or more authorization field values.

4. The method of claim 1, wherein the set of authorization messages are formatted in accordance with ISO-8583.

5. The method of claim 1 further comprising:
   determining that an authorization message has failed;
   predicting a second set of one or more authorization field values; and
   transmitting a second set of one or more authorization messages based on the predicted second set of one or more authorization field values.

6. The method of claim 1 further comprising:
   determining that an authorization message has failed;
   predicting a second set of one or more optimal send times; and
   transmitting a second set of one or more authorization messages based on the predicted second set of one or more optimal send times.

7. The method of claim 1, wherein predicting the set of one or more authorization field values to be included in an authorization message to produce a highest likelihood of successful authorization further comprises varying transaction amounts to be authorized based on previous authorization attempts.

8. The method of claim 1, wherein predicting the set of one or more optimal send times further comprises generating a dunning schedule for a particular customer based on the predicted set of optimal send times.

9. The method of claim 1, wherein the reinforcement learning approach comprises an epsilon greedy explore exploit approach.

10. A non-transitory computer readable medium containing processor instructions for payment recovery, where execution of the instructions by a processor causes the processor to perform a process that comprises:

receiving, at a computing device, a set of transaction information;

predicting, using a set of processors in the computing device, a set of one or more authorization field values based on the received set of transaction information, wherein the set of one or more authorization field values is predicted by using a set of one or more machine learning models to determine a subset of the set of one or more authorization field values to be included in an authorization message to produce a highest likelihood of successful authorization, wherein predicting the set of one or more authorization field values to be included in an authorization message to produce a highest likelihood of successful authorization comprises filtering out one or more authorization field values that decrease the likelihood of successful authorization, wherein predicting the set of one or more authorization field values comprises modifying at least one authorization field value of the set of one or more authorization field values;

predicting, using the set of processors in the computing device, a set of one or more optimal send times based on the received set of transaction information, wherein the set of one or more optimal send times is predicted by using the set of one or more machine learning models to determine a set of one or more optimal send times at which to send an authorization message to produce a highest likelihood of successful authorization, wherein the set of one or more optimal send times is predicted based on an expected number of transactions received by a given credit card issuer for an authorization message, wherein predicting the set of one or more optimal send times comprises using a reinforcement learning approach; and transmitting, from the computing device to the given credit card issuer, a set of one or more authorization messages based on the predicted set of one or more authorization field values and the predicted set of one or more optimal send times.

11. The non-transitory computer readable medium of claim 10, wherein the transaction information comprises transaction amount, card information, merchant information, and product information.

12. The non-transitory computer readable medium of claim 10, wherein predicting the set of one or more authorization field values comprises at least one of filtering to exclude at least one authorization field value from the set of one or more authorization field values.

13. The non-transitory computer readable medium of claim 10, wherein the process further comprises:
   determining that an authorization message has failed;
   predicting a second set of one or more authorization field values; and
   transmitting a second set of one or more authorization messages based on the predicted second set of one or more authorization field values.

14. The non-transitory computer readable medium of claim 10, wherein the process further comprises:
   determining that an authorization message has failed;
   predicting a second set of one or more optimal send times; and
   transmitting a second set of one or more authorization messages based on the predicted second set of one or more optimal send times.

15. The non-transitory computer readable medium of claim 10, wherein predicting the set of one or more authorization field values to be included in an authorization message to produce a highest likelihood of successful authorization further comprises varying transaction amounts to be authorized based on previous authorization attempts.

16. The non-transitory computer readable medium of claim 10, wherein predicting the set of one or more optimal send times further comprises generating a dunning schedule for a particular customer based on the predicted set of optimal send times.

17. The non-transitory computer readable medium of claim 10, wherein the reinforcement learning approach comprises an epsilon greedy explore exploit approach.

* * * * *